United States Patent
Lee et al.

(10) Patent No.: US 9,052,210 B2
(45) Date of Patent: *Jun. 9, 2015

(54) METHOD AND APPARATUS FOR REMINDING CALENDAR SCHEDULE AND RECORDING MEDIUM

(71) Applicant: HTC Corporation, Taoyuan County (TW)

(72) Inventors: Yu-Cheng Lee, Taoyuan County (TW); Kuang-Rong Lu, Taoyuan County (TW); John C. Wang, Taoyuan County (TW); Chi-Chen Cheng, Taoyuan County (TW); Peter Chin, Bellevue, WA (US)

(73) Assignee: HTC Corporation, Taoyuan (TW)

( * ) Notice: Subject to any disclaimer, the term of this patent is extended or adjusted under 35 U.S.C. 154(b) by 106 days.

This patent is subject to a terminal disclaimer.

(21) Appl. No.: 13/761,161

(22) Filed: Feb. 7, 2013

(65) Prior Publication Data

US 2013/0151143 A1 Jun. 13, 2013

Related U.S. Application Data

(63) Continuation-in-part of application No. 12/534,865, filed on Aug. 4, 2009, now Pat. No. 8,725,164.

(60) Provisional application No. 61/599,424, filed on Feb. 16, 2012.

(30) Foreign Application Priority Data

Aug. 22, 2008 (TW) .............................. 97132246 A

(51) Int. Cl.
*G01C 21/34* (2006.01)
*H04M 3/42* (2006.01)

(52) U.S. Cl.
CPC .......... *G01C 21/343* (2013.01); *H04M 3/42348* (2013.01); *H04M 2201/18* (2013.01); *H04M 2203/2072* (2013.01); *H04M 2207/18* (2013.01); *H04M 2242/30* (2013.01)

(58) Field of Classification Search
CPC .......... G01C 21/343; H04M 3/42438; H04M 2201/18; H04M 2203/2072; H04M 2207/18; H04M 2242/30
USPC ......... 701/425, 410, 411, 412, 416, 420, 426; 701/445, 446, 447, 451, 461, 462; 455/456.1, 414.1
See application file for complete search history.

(56) References Cited

U.S. PATENT DOCUMENTS

| | | | |
|---|---|---|---|
| 5,596,313 A * | 1/1997 | Berglund et al. ............. | 340/574 |
| 7,038,584 B2 * | 5/2006 | Carter ...................... | 340/539.13 |
| 2003/0146835 A1 | 8/2003 | Carter | |
| 2006/0189325 A1 | 8/2006 | Kim et al. | |
| 2008/0167800 A1 | 7/2008 | Geelen et al. | |
| 2009/0234659 A1 | 9/2009 | Liao et al. | |

FOREIGN PATENT DOCUMENTS

| TW | 200705304 | 2/2007 |
|---|---|---|
| TW | 200939145 | 9/2009 |

* cited by examiner

*Primary Examiner* — Richard Camby
(74) *Attorney, Agent, or Firm* — Jianq Chyun IP Office

(57) ABSTRACT

A method and an apparatus for reminding a calendar schedule and a recording medium are provided. First, a schedule and a location of an event are set in a calendar, and first positioning information of the location is obtained. Then, second positioning information of a current location of a mobile device is obtained. Next, the current location is determining whether to be within a signal range of a signal source. Once the current location is within the signal range, the time for moving from the location with the second positioning information to the location with the first positioning information is calculated. Finally, a reminding time is set according to the transferring time, and a reminding action is taken at the reminding time. Thereby, the reminding time of the event can be dynamically adjusted to avoid delay caused when the mobile device is too far from the event location.

20 Claims, 11 Drawing Sheets

METHOD AND APPARATUS FOR REMINDING CALENDAR SCHEDULE AND RECORDING MEDIUM

CROSS-REFERENCE TO RELATED APPLICATION

This application is a continuation-in-part of and claims the priority benefit of U.S. application Ser. No. 12/534,865, filed on Aug. 4, 2009, now pending, and also claims the priority benefit of U.S. provisional application Ser. No. 61/599,424, filed on Feb. 16, 2012. The prior U.S. application Ser. No. 12/534,865 claims the priority benefit of Taiwan application serial no. 97132246, filed on Aug. 22, 2008. The entirety of each of the above-mentioned patent applications is hereby incorporated by reference herein and made a part of this specification.

BACKGROUND

The broad application of mobile devices has changed our life style gradually. For example, in the past, people used to write down notes of important events in calendars, while nowadays, people use electronic calendar function disposed in mobile devices (such as mobile phones and Personal Digital Assistances (PDAs)) to record those events. An electronic calendar provides a lot of convenience in event recording. By integrating the electronic calendar into a mobile device, a user can be reminded of his/her upcoming event. Thus, nowadays, many businessmen use the electronic calendar function provided by mobile devices to record various events, such as visiting customers, delivering goods, dating, and business trips, etc.

An important function of an electronic calendar is providing a reminding message to a user when the schedule of a stored event is due. The user may also set the reminding message to an earlier time (for example, 10 minutes earlier) so that the calendar can provide the reminding message at the set earlier time to remind the user in advance. However, even though the user can be reminded of an event through the method described above, the time it takes for the user to reach the event location is not considered. As a result, the user may be late for the event or even miss it. For example, if a user is visiting a customer at Taoyuan County and the calendar reminds the user that there will be a conference at Taipei 10 minutes later, the user will definitely be late for or even miss the event due to the long distance between the two places.

Besides, most of the time, the user does not provide detailed location information when setting an event in the calendar and usually uses a simplified name (e.g. meeting room A101). However, without detailed location information, it is not easy to share the event location to other people who do not know the event location. Also, the time for reminding the event set by the calendar reminder may not be earlier enough to guarantee that the user can arrive at the event location in time.

SUMMARY

Accordingly, the present application is directed to a method for reminding a calendar schedule, in which a reminding message is provided in advance to a user according to the distance between the location of the user and the location of an event, so that the user will not be late for the event when the user is very far from the event location.

The present application is directed to an apparatus for reminding a calendar schedule, in which the location of a user is detected in real time by using a positioning module, and the time required by the user for moving to the location of an event is calculated such that a reminding time of the calendar schedule can be dynamically adjusted.

The present application provides a recording medium, in which the recording medium can be loaded into an electronic device and executed by the same to perform a reminding action of an event in advance.

The present application provides a method for reminding a calendar schedule, in which the method is suitable for a mobile device. The method comprises following steps. First, a schedule and a location of an event are set in a calendar, and first positioning information of the location is obtained. Then, second positioning information of a current location of the mobile device is obtained. Next, the current location is determined whether to be within a signal range of a signal source which provides services at the event location. Once the current location is within the signal range, a transferring time for moving from the location with the second positioning information to the location with the first positioning information is calculated. Finally, a reminding time of the event is set according to the transferring time, and a reminding action of the event is performed at the reminding time, wherein the reminding time is earlier than the schedule for a length of the transferring time and a predetermined time.

According to an example of the present application, the second positioning information may be obtained through the positioning of a positioning module, and the first positioning information may also be obtained through the positioning of the positioning module or by inquiring an electronic map or a positioning information database, in which the electronic map and the positioning information database contain positioning information of a plurality of locations.

According to an example of the present application, the step of calculating the transferring time for moving from the location with the second positioning information to the location with the first positioning information comprises calculating the transferring time for moving from the second positioning information to the first positioning information by referring to road speed limit information in the electronic map.

According to an example of the present application, in the step of calculating the transferring time for moving from the location with the second positioning information to the location with the first positioning information by referring to the road speed limit information in the electronic map, a path for moving from the location with the second positioning information to the location with the first positioning information is planed by referring to the electronic map, and then the transferring time for moving from the location with the second positioning information to the location with the first positioning information is calculated by referring to road speed limit information of one or multiple roads passed through by the path in the electronic map.

According to an example of the present application, in the step of calculating the transferring time for moving from the location with the second positioning information to the location with the first positioning information by referring to the road speed limit information in the electronic map, a distance between the location with the second positioning information and the location with the first positioning information is calculated, and the distance is divided by the road speed limit information to obtain the transferring time.

According to an example of the present application, before the step of obtaining the second positioning information of the current location of the mobile device, the method further comprises setting a turn-on time for turning on the mobile device to obtain the second positioning information of the current location of the mobile device and turning on the mobile device to obtain the second positioning information of the current location of the mobile device at the turn-on time, in which the turn-on time is a time earlier than the schedule of the event for a fixed length of time or is a specific time set by a user.

According to an example of the present application, the reminding action comprises broadcasting or displaying a reminding message of the event.

The present application provides an apparatus for reminding a calendar schedule. The apparatus comprises a calendar module, a positioning module, a calculation unit, and a reminding module. The calendar module sets a schedule and a location of an event and obtains first positioning information of the location. The positioning module obtains second positioning information of a current location and determines whether the current location is within a signal range of a signal source which provides services at the event location. The calculation unit calculates a transferring time for moving from the location with the second positioning information to the location with the first positioning information when the positioning module determines the current location exceeds the signal range of the signal source and sets a reminding time of the event according to the transferring time, wherein the reminding time is earlier than the schedule for a length of the transferring time and a predetermined time. The reminding module performs a reminding action of the event at the reminding time.

According to an example of the present application, the apparatus further comprises a storage unit for storing an electronic map or a positioning information database, in which the electronic map and the positioning information database contain positioning information of a plurality of locations.

According to an example of the present application, the calculation unit calculates the transferring time for moving from the location with the second positioning information to the location with the first positioning information by referring to road speed limit information in the electronic map.

According to an example of the present application, the apparatus further comprises a navigation module which plans a path for moving from the location with the second positioning information to the location with the first positioning information by referring to the electronic map, in which the calculation unit calculates the transferring time for moving from the location with the second positioning information to the location with the first positioning information by referring to road speed limit information of one or multiple roads passed through by the path in the electronic map.

According to an example of the present application, the calculation unit calculates a distance between the location with the second positioning information and the location with the first positioning information and divides the distance by the road speed limit information to obtain the transferring time.

According to an example of the present application, the reminding module further sets a turn-on time for turning on the positioning module to obtain the second positioning information of the current location and turns on the positioning module to obtain the second positioning information of the current location at the turn-on time, in which the turn-on time is a time earlier than the schedule of the event for a fixed length of time or is a specific time set by a user.

According to an example of the present application, the positioning module may be a global positioning system (GPS) or a device using a base station of the global system for mobile communication (GSM) system, the personal handy-phone system (PHS), or the code division multiple access (CDMA) system, a wireless fidelity (Wi-Fi) hotspot, a radio repeater, or a radio broadcaster for positioning.

According to an example of the present application, the apparatus is disposed in a mobile device, in which the mobile device is a mobile communication device, such as a mobile phone, a smart phone, a personal digital assistant (PDA), or a PDA phone; a navigation device; a notebook; a car PC; or a media player.

The present application provides a recording medium which records program instructions to be loaded into a mobile device to execute following steps. First, a schedule and a location of an event are set in a calendar, and first positioning information of the location is obtained. Then, second positioning information of a current location of the mobile device is obtained. Next, a transferring time for moving from the location with the second positioning information to the location with the first positioning information is calculated. Eventually, a reminding time of the event is set according to the transferring time, and a reminding action of the event is performed at the reminding time.

The present application provides a method for reminding a calendar schedule, in which the method is suitable for a mobile apparatus. In the method, a first schedule and a first location of a first event in a calendar are set. Next, first positioning information of a current location of the mobile apparatus is obtained during the first event according to the first schedule, and stored as event positioning information of the first location. Then, the event positioning information is retrieved for reminding the calendar schedule when the first location is set in a next event.

According to an example of the present application, in the step of setting the first schedule and the first location of the first event in the calendar, a notification of the first event is retrieved, and a location name in the notification is recognized and set as the first location of the first event.

According to an example of the present application, in the step of storing the first positioning information as event positioning information of the first location, the first positioning information is compared with a previously stored event positioning information of the first location. If the first positioning information matches the previously stored event positioning information, the previously stored event positioning information is kept. If the first positioning information does not match the previously stored event positioning information, the previously stored event positioning information is replaced with the first positioning information.

According to an example of the present application, in the step of obtaining the first positioning information of the current location of the mobile apparatus during the first event according to the first schedule, and storing the first positioning information as the event positioning information of the first location, multiple first positioning information are repeatedly obtained during the first event, the obtained multiple first positioning information are compared with each others and the most repeatedly first positioning information as the event positioning information is concluded, and then the concluded first positioning information is stored as the event positioning information of the first location.

According to an example of the present application, in the step of storing the first positioning information as the event positioning information of the first location, the first positioning information is transmitted to a remote server and stored in the remote server as the event positioning information of the first location.

According to an example of the present application, in the step of retrieving the event positioning information for reminding the calendar schedule when the first location is set in the next even, a second schedule and a second location of a second event in the calendar are set, and the event positioning information of the first location is obtained as the event positioning information of the second location if the second location is equal to the first location. Then, second positioning information of the current location of the mobile apparatus is obtained and the current location is determined whether within a signal range of a signal source which provides services at the second location. When the current location exceeds the signal range of the signal source, a transferring time for moving from the location with the second positioning information to the location with the event positioning information is calculated, a reminding time of the second event is set according to the transferring time, and a reminding action of the second event is performed at the reminding time, wherein the reminding time is earlier than the schedule for a length of the transferring time and a predetermined time.

According to an example of the present application, in the step of calculating the transferring time for moving from the location with the second positioning information to the location with the event positioning information, the transferring time for moving from the second positioning information to the first positioning information is calculated by referring to road information in the electronic map or a position information database or by referring to walking pace.

According to an example of the present application, in the step of calculating the transferring time for moving from the location with the second positioning information to the location with the event positioning information, the transferring time for moving from the location with the second positioning information to the location with the event positioning information is calculated by referring to weather information in a weather information database.

According to an example of the present application, after the step of setting the reminding time of the second event according to the transferring time, the method further sets a check point at a time point between a current time and the reminding time, obtains at least one third positioning information of the current location of the mobile apparatus at each of the check points, and determines whether the obtained third positioning information is the same as the previously obtained second positioning information. If the third positioning information is not the same as the second positioning information, the transferring time is re-calculated and the reminding time is re-set according to the re-calculated transferring time.

According to an example of the present application, after the step of calculating the transferring time for moving from the location with the second positioning information to the location with the event positioning information, the method further determines whether the transferring time is longer than a rest time from a current time to the second schedule of the second event. If the transferring time is longer than the rest time, a message indicating a late arrival for the second event is prompted.

According to an example of the present application, if the transferring time is longer than the rest time, the method further retrieves contact information of at least one attendee of the second event, and sends the message indicating the late arrival for the second event to the attendee according to the retrieved contact information.

According to an example of the present application, in the step of calculating the transferring time for moving from the location with the second positioning information to the location with the event positioning information, a path for moving from the location with the second positioning information to the location with the event positioning information is planed, and then the transferring time for moving from the location with the second positioning information to the location with the first positioning information is calculated by referring to road speed limit information of one or multiple roads passed through by the path in the electronic map.

According to an example of the present application, the transferring time is divided into a plurality of time intervals and at least one third positioning information of the current location of the mobile apparatus is obtained at each of the plurality of time intervals and stored as references to plan a path for moving from the location with the second positioning information to the location with the event positioning information in the next event.

According to an example of the present application, before the step of obtaining the second positioning information of the current location of the mobile apparatus, the method further comprises setting a turn-on time for turning on the mobile apparatus to obtain the second positioning information of the current location of the mobile apparatus and turning on the mobile apparatus to obtain the second positioning information of the current location of the mobile apparatus at the turn-on time, in which the turn-on time is a time earlier than the schedule of the event for a fixed length of time or is a specific time set by a user.

The present application provides an apparatus for reminding a calendar schedule. The apparatus comprises a calendar module, a positioning module, a storage module, and a reminding module. The calendar module is configured to set a first schedule and a first location of a first event in a calendar. The positioning module is configured to obtain first positioning information of a current location during the first event according to the first schedule. The storage module is configured to store the first positioning information as event positioning information of the first location. The reminding module is configured to retrieving the event positioning information for reminding the calendar schedule when the first location is set in a next event.

According to an example of the present application, the calendar module further retrieves a notification of the first event, recognizes a location name in the notification, and sets the location name as the first location of the first event.

According to an example of the present application, the storage module further compares the first positioning information with a previously stored event positioning information of the first location, keeps the previously stored event positioning information if the first positioning information matches the previously stored event positioning information, and replaces the previously stored event positioning information with the first positioning information if the first positioning information does not match the previously stored event positioning information.

According to an example of the present application, the positioning module repeatedly obtains multiple first positioning information during the first event, and the storage module compares the obtained multiple first positioning information with each others and conclude the most repeatedly first positioning information as the event positioning information, and stores the concluded first positioning information as the event positioning information of the first location.

According to an example of the present application, the apparatus further comprises a data transmitting module, which transmits the first positioning information to a remote server and stores the first positioning information in the remote server as the event positioning information of the first location.

According to an example of the present application, the calendar module sets a second schedule and a second location of a second event and obtains the event positioning information of the first location if the second location is equal to the first location. The positioning module obtains second positioning information of the current location and determines whether the current location is within a signal range of a signal source which provides services at the second location. The calculation module calculates a transferring time for moving from the location with the second positioning information to the location with the event positioning information when the positioning module determines the current location exceeds the signal range of the signal source and sets a reminding time of the second event according to the transferring time, wherein the reminding time is earlier than the schedule for a length of the transferring time and a predetermined time. The reminding module performs a reminding action of the event at the reminding time.

According to an example of the present application, the calculation module calculates the transferring time for moving from the location with the second positioning information to the location with the event positioning information by referring to road information in the electronic map or a positioning information database or by referring to walking pass.

According to an example of the present application, the calculation module calculates the transferring time for moving from the location with the second positioning information to the location with the event positioning information by referring to weather information in a weather information database.

According to an example of the present application, the apparatus further comprises a navigation module which plans a path for moving from the location with the second positioning information to the location with the event positioning information by referring to the electronic map, in which the calculation module calculates the transferring time for moving from the location with the second positioning information to the location with the event positioning information by referring to road speed limit information of one or multiple roads passed through by the path in the electronic map.

The present application provides a recording medium which records program instructions to be loaded into a mobile apparatus to execute following steps. First, a first schedule and a first location of a first event in a calendar are set. Next, first positioning information of a current location of the mobile apparatus is obtained during the first event according to the first schedule, and stored as event positioning information of the first location. Then, the event positioning information is retrieved for reminding the calendar schedule when the first location is set in a next event.

In the present application, a positioning module is integrated with an electronic calendar for obtaining the event location of a user during the event, and the time for the user to reach the event location t is determined by referring to the schedule and the event location in the electronic calendar. Accordingly, a reminding message can be provided to the user in advance so that the user will not be late for the event even if the user is very far from the event location.

BRIEF DESCRIPTION OF THE DRAWINGS

The accompanying drawings are comprised to provide a further understanding of the application, and are incorporated in and constitute a part of this specification. The drawings illustrate examples of the application and, together with the description, serve to explain the principles of the application.

DESCRIPTION

Reference will now be made in detail to the present examples of the application, examples of which are illustrated in the accompanying drawings.

By setting a calendar, a user can be reminded in advance to set off for the location of an event. However, the reminding time has to be brought earlier if the user is very far from the event location. According to the present application, the location of the user is detected in real time by a positioning module disposed in the mobile device, and the reminding time of the event is dynamically adjusted so that the user can be reminded in advance and have enough time to reach the event location. The present application provides a method and an apparatus for reminding a calendar schedule and a recording medium using the method based on the concept described above. Examples of the present application will be described below with reference to accompanying drawings.

Figure 1:
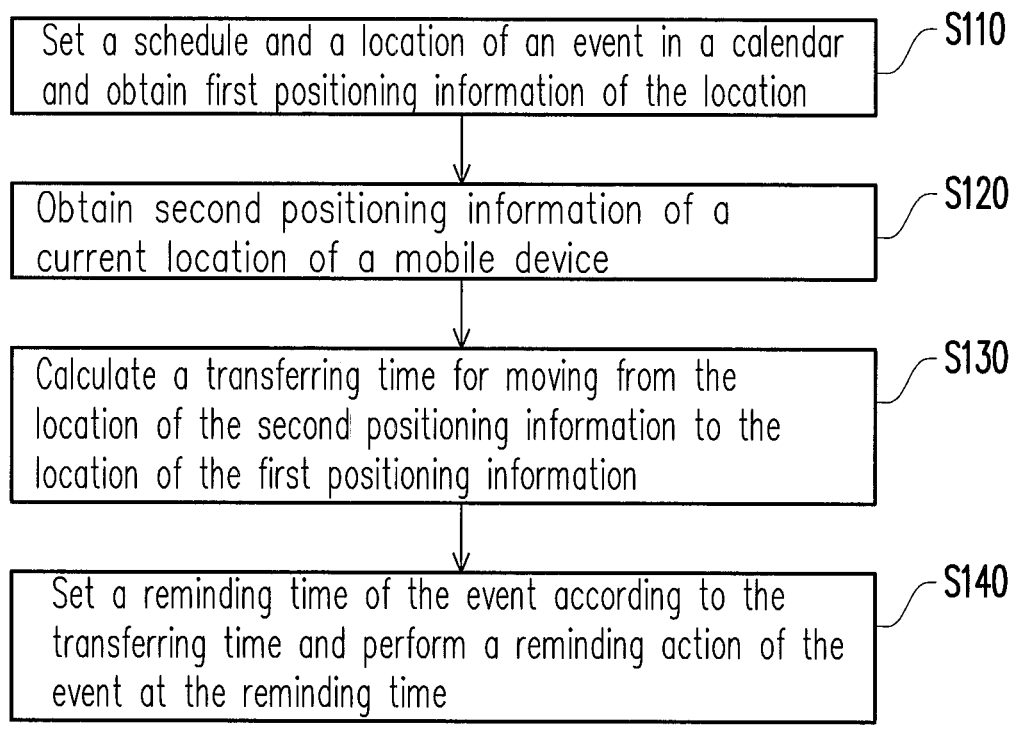
FIG. 1 is a flowchart of a method for reminding a calendar schedule according to an example of the present application.

FIG. 1 is a flowchart of a method for reminding a calendar schedule according to an example of the present application. Referring to FIG. 1, the method in the present example is suitable for a mobile device with an electronic calendar and a positioning function. The mobile device may be a mobile communication device, such as a mobile phone, a smart phone, a personal digital assistant (PDA), or a PDA phone; a navigation device; a notebook; a car PC; or a media player; however, the scope of the mobile device is not limited in the present application.

First, a schedule and a location of an event are set in the calendar of the mobile device, and first positioning information of the location is obtained (step S110). The event may be a conference, a class, a meeting; a date, or something the user needs to do, for example, and besides the content and schedule of the event, the event location is further stored in the calendar, such as the address, city, building, conference room of a conference. The mobile device can obtain positioning information of the location through the positioning module or by inquiring an electronic map or a positioning information database; however, the method for obtaining the positioning information is not limited in the present example.

To be specific, the positioning module may be a global positioning system (GPS) or a device using the Global System for Mobile Communication (GSM), the Personal Handyphone System (PHS), the Code Division Multiple Access (CDMA) system, an access point of a wireless fidelity (Wi-Fi) hotspot, a radio repeater, or a radio broadcaster for positioning. When the user set an event, if the user is at the same location of the event (for example, in the same building), positioning information of the event location can be obtained instantly through the positioning module and use the current location of the mobile device as the positioning information of the event location.

On the other hand, if the user is at a location different from the event location when the user sets the event, the positioning information of the event location can be obtained by inquiring an electronic map or a positioning information database. The electronic map and the positioning information database comprise the positioning information of a plurality of locations. These locations may be general points of interest (POI) in an electronic map or may also be locations set by the user, and the positioning information comprises (but is not limited to) addresses, roads, blocks, buildings, or site names, etc. Besides, the user may also select or pick a specific location in the electronic map as the event location, and the electronic map can convert such information into the positioning information and store it into the calendar.

To obtain the positioning information of the event location by inquiring the electronic map, the address, road, block, building, or name of POI entered by the user when the user sets the event location is compared with the positioning information stored in the electronic map. The same method is able to applied to the positioning information database inquiring, in which the positioning information database contains positioning information such as (but is not limited to) POIs, blocks, addresses, buildings, or site names, etc. The positioning information of the event location can also be obtained by comparing the positioning information stored in the positioning information database. Furthermore, the user may select or pick the event location in the electronic map and then store it in the electronic may or positioning information database, so that the added event location may used for positioning information comparing in the future. The electronic map and the positioning information database may be stored in the mobile device or in an external server. The mobile device can obtain the desired positioning information by querying the server.

After the event is set in the calendar, the mobile device constantly detects the location of the user through the positioning module to obtain second positioning information of the current location of the user (step S120). Besides positioning the user through a global positioning system (GPS), the mobile device may also position the user through a base station provided by a communication service provider or through a nearby wireless fidelity (Wi-Fi) hotspot (access point). The foregoing positioning methods require only very low power consumption therefore allow the mobile device to detect the location of the user for a long time.

In another example of the present application, after the event is set in the calendar, the user can set a time for the mobile device to start detecting the current location of the mobile device through the positioning module according to the user's own situation, so as to obtain the second positioning information of the current location. For example, the user may set that the positioning module is only turned in a period of time (for example, 6 hours) before the event starts or at a specific time. The power consumed by the positioning module can be reduced through the method described above.

After that, the mobile device calculates a transferring time for moving from the location with the second positioning information to the location with the first positioning information (step S130). In other words, the mobile device calculates the time required by the user to reach the event location from the user's current location, and the transferring time may be calculated by referring to road speed limit information in the electronic map or position information database.

To be specific, the speed limit information of each road is stored in the electronic map or position information database. When the mobile device calculates the transferring time, the mobile device first plans a path for moving from the location with the second positioning information to the location with the first positioning information through a navigation software in the mobile device or in an external server and then calculates the transferring time for moving from the location with the second positioning information to the location with the first positioning information by referring to the road speed limit information of one or multiple roads passed through by the path in the electronic map.

It should be mentioned that if there is no navigation software or the distance between the location with the first positioning information and the location with the second positioning information is short, the mobile device can directly calculate the distance between the location with the first positioning information and the location with the second positioning information, and then divide the distance by the road speed limit information (for example, a road average speed limit information stored in the electronic map or position information database) or walking pace (for example, 5-7 km/hr) to obtain the transferring time; however, the present application is not limited to the calculation methods described above.

It should be mentioned that even though in the examples described above, the transferring time for moving from the location with the second positioning information to the location with the first positioning information is calculated by using the distance (for example, the road distance or straight distance) between the location with the first positioning information and the location with the second positioning information and a speed limit information (for example, road speed limit information or an average speed limit information) or walking pace, the present application is not limited thereto, and any method which can calculate the transferring time for moving from the location with the second positioning information to the location with the first positioning information can be applied to the present application.

Finally, the mobile device sets a reminding time of the event according to the transferring time and performs a reminding action of the event at the reminding time (step S140). The reminding action may be giving out a reminding sound, playing an audio message, or displaying a reminding message in the mobile device; however, the scope of the reminding action is not limited in the present application. It should be noted herein that the reminding time is a time earlier than the schedule of the event for the length of the transferring time or for the length of the transferring time plus a predetermined time, in which the predetermined time can be set by the mobile device or by the user when the user sets the event; however, the present application is not limited thereto.

Figure 2:
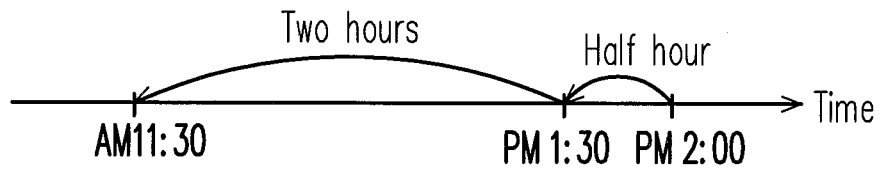
FIG. 2 illustrates an example of how to calculate a reminding time according to an example of the present application.

FIG. 2 illustrates an example of how to calculate a reminding time according to an example of the present application. Referring to FIG. 2, assuming that a conference is scheduled at 2:00 pm by a user, the calendar or the user then advances the reminding time of the conference for a period of time (for example, half an hour), and accordingly the reminding message should be provided at 1:30 pm. Next, the transferring time of the user is calculated through the method described above to be 2 hours, and then the calendar sets the reminding time to be 2 hours earlier than the preset reminding time, namely, the reminding message is provided to the user at 11:30 am.

Through the method described above for dynamically adjusting the reminding time, the user can receive the reminding message at the time that can make the user to arrive at the event on time regardless of the location thereof. It should be mentioned that in the present application, in order to reduce the power consumption of the positioning module, whether the user is around the event location is further determined to decide whether to advance the reminding time. This will be described below with reference to an example of the present application.

Figure 3:
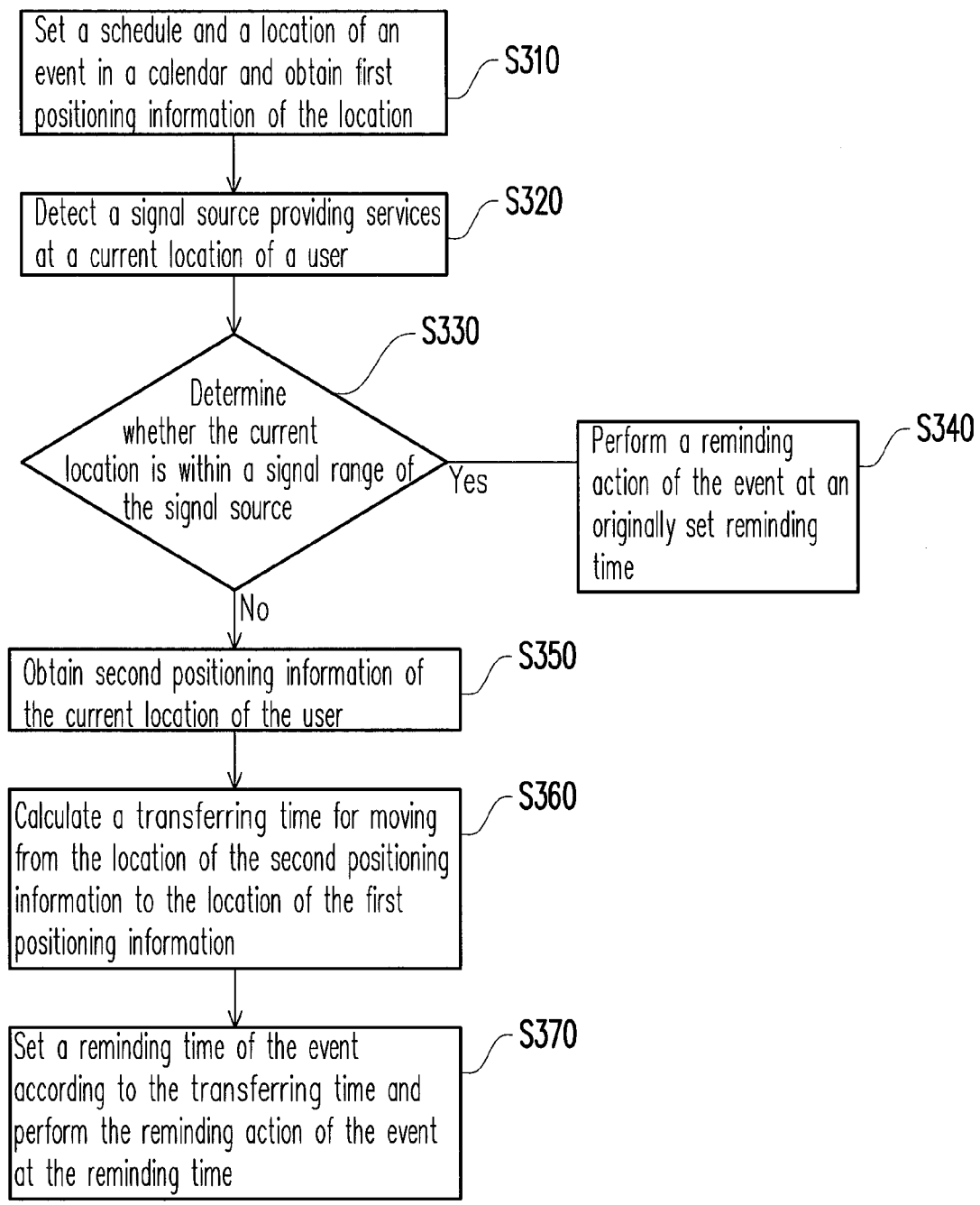
FIG. 3 is a flowchart of a method for reminding a calendar schedule according to an example of the present application.

FIG. 3 is a flowchart of a method for reminding a calendar schedule according to an example of the present application. Referring to FIG. 3, the method in the present example is suitable for a mobile device with an electronic calendar and a positioning function. The mobile device is, for example, a mobile communication device, such as a mobile phone, a smart phone, a personal digital assistant (PDA), or a PDA phone; a navigation device; a notebook; a car PC; or a media player; however, the scope of the mobile device is not limited in the present application.

Similarly, in the present example, a schedule and a location of an event are set in a calendar of the mobile device, and first positioning information of the location is obtained (step S310).

Then, the mobile device detects a signal source for providing service at a current location of the user (step S320) and determines whether the current location is within a signal range of the signal source (step S330). For example, the user can identify whether a base station which provides services at the location of the user is the same base station for providing services at the event location by using an identification code received from the base station.

If it is determined in step S330 that the current location is still within the signal range of the signal source which provides services at the event location, the reminding action of the event is performed at the originally set reminding time (step S340), and the transferring time is not calculated to advance the reminding time through the method provided by the present application. In short, the mobile device determines whether the user is close to the event location based on whether the user is within the signal range of the base station which provides services at the event location. If the user is around the base station for providing services at the event location, it can be determined that the user is not far from the event location (for example, in the same building) and can reach the event location within the predetermined time, so that it is not necessary to detect the positioning information or calculate the transferring time. Since detecting the signal of a base station is only a routine work carried out in the standby state by each mobile phone, the power consumption of the mobile phone won't be increased. Thereby, the flexibility in using the reminding method provided by the present application is increased by adopting the method described above.

Contrarily, if it is determined that the current location is out of the signal range of the signal source for providing services at the event location, the current location of the user is further detected through the positioning module so as to obtain second positioning information of the current location (step S150). After that, a transferring time required for moving from the location with the second positioning information to the location with the first positioning information is calculated (step S160). Next, the reminding time of the event is set according to the transferring time, and a reminding action of the event is performed at the reminding time (step S170). The contents of steps S350~S370 are the same as or similar to those of the steps S120~S140 described in foregoing example such that the detail will not be described herein.

The present application also provides a reminding apparatus corresponding to the reminding method described above. The apparatus is suitable for being disposed in a mobile device, such as a mobile phone, a smart phone, a personal digital assistant (PDA), or a PDA phone; a navigation device; a notebook; a car PC; or a media player, carried by a user and reminding the user to set off in advance for an event. Below, the reminding apparatus in the present application will be described in detail with reference to an example of the present application.

Figure 4:
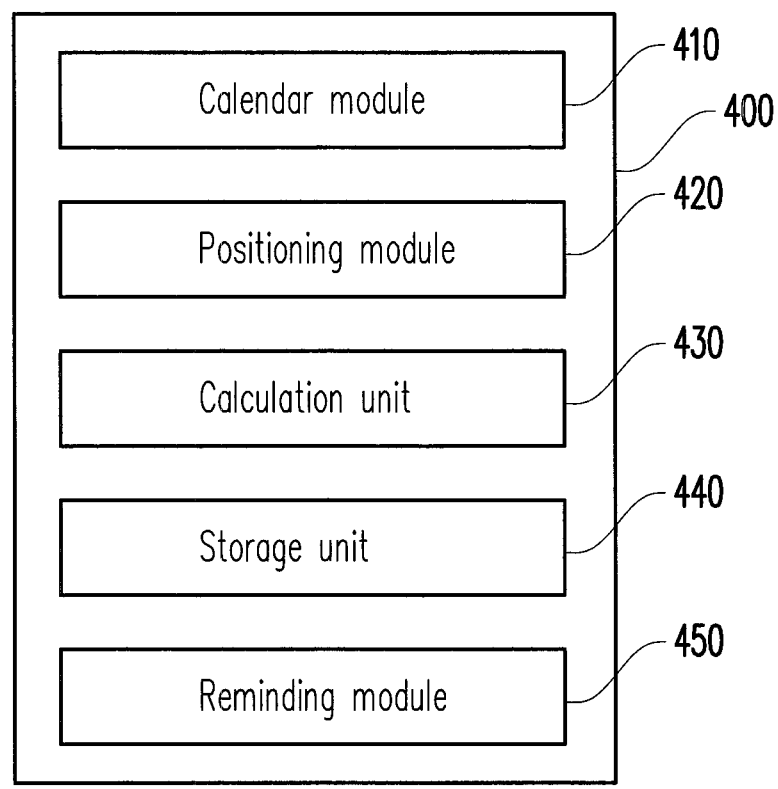
FIG. 4 is a block diagram of an apparatus for reminding a calendar schedule according to an example of the present application.

FIG. 4 is a block diagram of an apparatus for reminding a calendar schedule according to an example of the present application. Referring to FIG. 4, in the present example, the reminding apparatus 400 comprises a calendar module 410, a positioning module 420, a calculation unit 430, a storage unit 440, and a reminding module 450. The functions of foregoing components will be respectively described below.

The calendar module 410 sets a schedule and a location of an event and obtains first positioning information of the location. The positioning module 420 positions the reminding apparatus 400 to obtain second positioning information of the current location of the reminding apparatus 400. The positioning module 420 may be a GPS or a device using a base station of the GSM, PHS, or CDMA system, or a Wi-Fi hotspot for positioning.

The calculation unit 430 may be a microprocessor. The calculation unit 430 calculates a transferring time for moving from the location with the second positioning information to the location with the first positioning information and sets a reminding time of the event according to the transferring time. The calculation unit 430 accesses an electronic map or a positioning information database stored in the storage unit 440 to obtain the first positioning information of the event location. In addition, the calculation unit 430 can calculate the transferring time for moving from the location with the second positioning information to the location with the first positioning information by inquiring the road speed limit information stored in the electronic map.

To be specific, the electronic map records the speed limit information of each road, and when the mobile device calculates the transferring time, it first plans a path for moving from the location with the second positioning information to the location with the first positioning information through a navigation module (not shown) by referring to the electronic map and then calculates the transferring time for moving from the location with the second positioning information to the location with the first positioning information by referring to the road speed limit information of one or multiple roads passed through by the path in the electronic map. In another example, the transferring time may be calculated based on the walking path.

On the other hand, if there is no navigation module, the calculation unit 430 can directly calculate the straight distance between the location with the first positioning information and the location with the second positioning information and then divide the straight distance by an average speed limit information stored in the electronic map or the average walking path to obtain the transferring time; however, the present application is not limited thereto.

The reminding module 450 executes a reminding action of the event at the reminding time provided by the calculation unit 430. The reminding action may be giving out a reminding sound, playing an audio message, or displaying a reminding message in the mobile device.

It should be mentioned that the electronic map and the positioning information database stored in the storage unit 440 contain the positioning information of a plurality of locations, in which these locations may be POIs or other locations specified by the user, and the positioning information comprises (but is not limited to) addresses, roads, blocks, buildings, or site names, etc. Thus, the calendar module 410 can obtain the positioning information of the event location set by the user by inquiring the electronic map or positioning information database according to the event location or through the positioning of the positioning module 420. The method for obtaining the positioning information of the event location has been described in foregoing examples such that the detail will not be described herein.

On the other hand, in order to reduce the power consumption of the reminding apparatus 400, the positioning module 420 further determines whether the current location is within a signal range of a signal source that provides services at the event location, and the calculation unit 430 only calculates the transferring time and adds it to the reminding time when it is determined that the current location exceeds the signal range of the signal source.

The present application further provides a recording medium which records a computer program to be loaded into a mobile device to execute the calendar schedule reminding method described above. The computer program is composed of a plurality of program segments (for example, an organization chart establishing program segment, an approval form program segment, a setting program segments, and a deployment program segment). The program segments are loaded into the mobile device and executed by the same to accomplish the calendar schedule reminding method and the functions of the calendar schedule reminding apparatus described above.

It is noted that the aforesaid event location is usually set with a simplified name (e.g. meeting room number; office name, company name, building name, scenic spot name, etc.) instead of a precise location, which causes the reminding time for attending the event may not be accurately estimated. According to the present application, the positioning information (e.g. longitude and latitude, or address) of the location of the user is detected during the event, and is used as references to calculate the reminding time of a next event which is assigned with the same location so that the user can be reminded in advance and has enough time to reach the event location. The present application provides a method and an apparatus for reminding a calendar schedule and a recording medium using the method based on the concept described above. Examples of the present application will be described below with reference to accompanying drawings.

Figure 5:
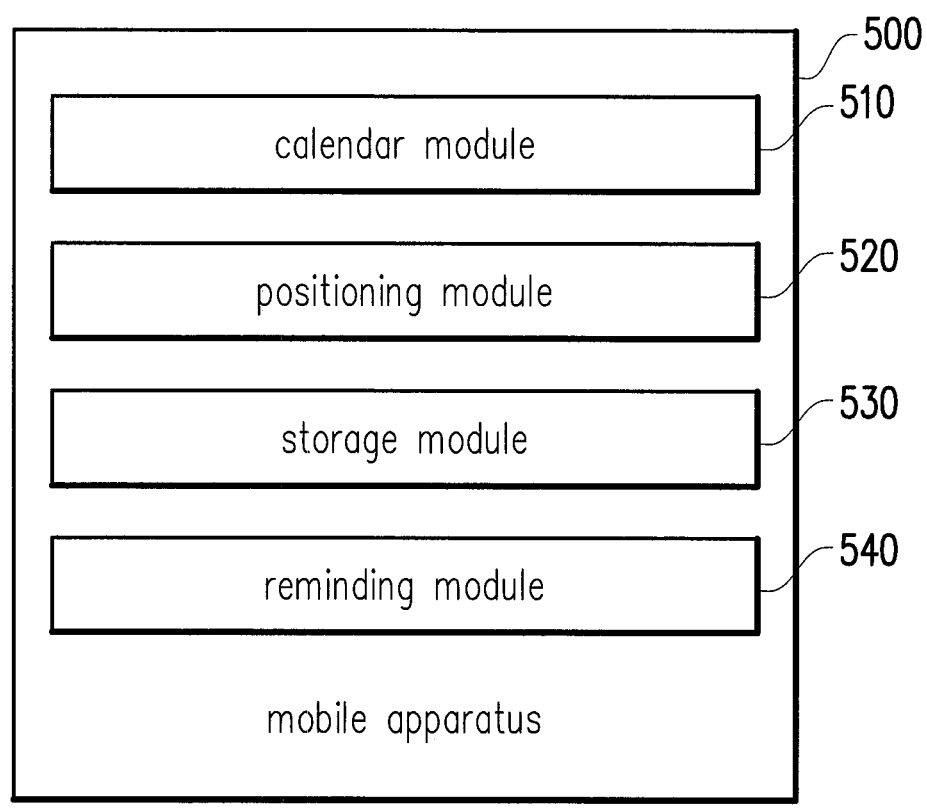
FIG. 5 is a block diagram of a mobile apparatus for reminding a calendar schedule according to an example of the present application.

FIG. 5 is a block diagram of a mobile apparatus for reminding a calendar schedule according to an example of the present application. Referring to FIG. 5, in the present example, the mobile apparatus 500 comprises a calendar module 510, a positioning module 520, a storage module 530, and a reminding module 540. The mobile apparatus 500 is, for example, a mobile phone, a smart phone, a personal digital assistant (PDA), a PDA phone, a navigation device, a notebook, a car PC, or a media player, carried by a user and capable of reminding the user to set off in advance for an event.

The calendar module 510, the positioning module 520, the storage module 530, and the reminding module 540 are, for example, hardware devices composed of logic circuit elements, and are suitable for executing a function of reminding a calendar schedule. These modules can also be programs stored in the storage of the mobile apparatus 500, which can be loaded to a processor of the mobile apparatus 500 to execute the function of reminding a calendar schedule. The positioning module 520 may be a global positioning system (GPS) or a device using the Global System for Mobile Communication (GSM), the Personal Handy-phone System (PHS), the Code Division Multiple Access (CDMA) system, an access point of a wireless fidelity (Wi-Fi) hotspot, a radio repeater, or a radio broadcaster for positioning. An embodiment is provided below to describe detailed steps of executing the function for reminding a calendar schedule by the mobile apparatus 10.

Figure 6:
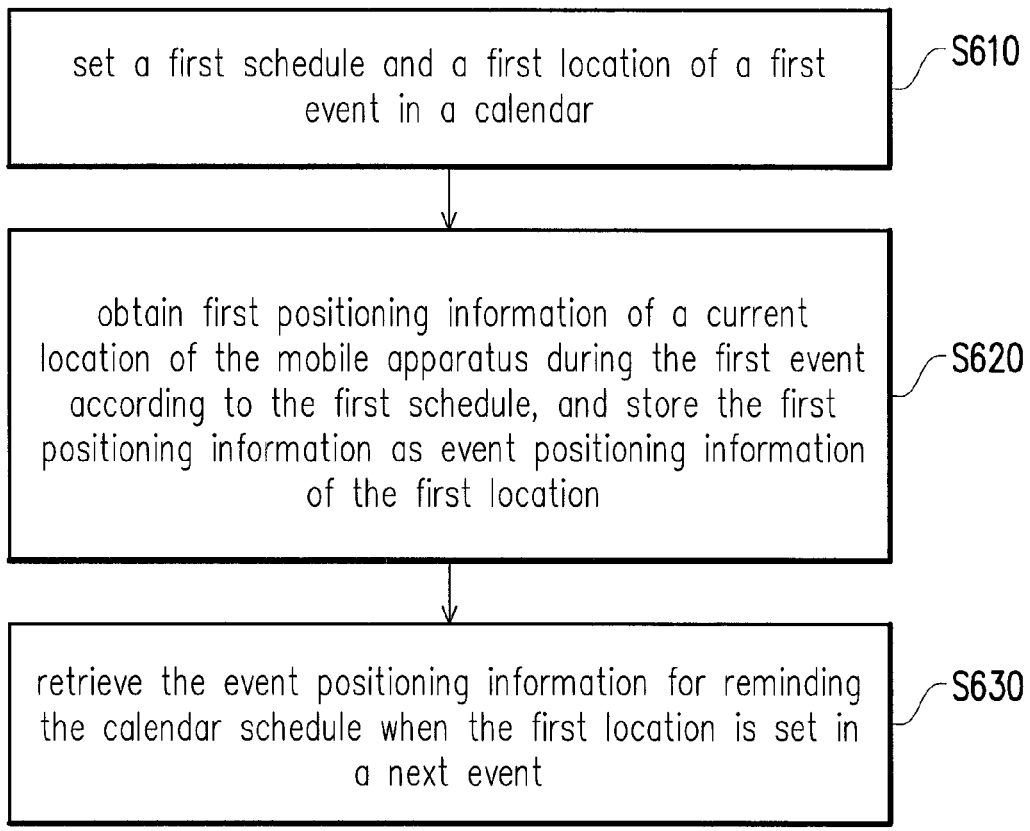
FIG. 6 is a flowchart of a method for reminding a calendar schedule according to an example of the present application.

FIG. 6 is a flowchart of a method for reminding a calendar schedule according to an example of the present application. Referring to FIG. 6, the method in the present example is adapted to the mobile apparatus 500 of FIG. 5, and detailed steps of the method for reminding a calendar schedule are described below in collaboration with various components of the mobile apparatus 500.

First, the calendar module 510 sets a first schedule and a first location of a first event in the calendar of the mobile apparatus, and the positioning module 520 obtains first positioning information of the current location (step S610). The event may be a conference, a class, a meeting, a date, or something the user needs to do. Besides the content and schedule of the event, the event location is further decided and stored in the calendar, such as the address, city, building, conference room of a conference.

The calendar module 510 may obtain the first location through the notification of the event such as a message, or an e-mail, for example a meeting invitation. To be specific, the calendar module 510 may retrieve the notification of the first event and recognize a location name in the notification so as to set the location name as the first location of the first event. Further, the calendar module 510 may obtain positioning information of the first location through the positioning module 520 or by inquiring an electronic map or a positioning information database; however, the method for obtaining the positioning information is not limited in the present example.

Figure 7:
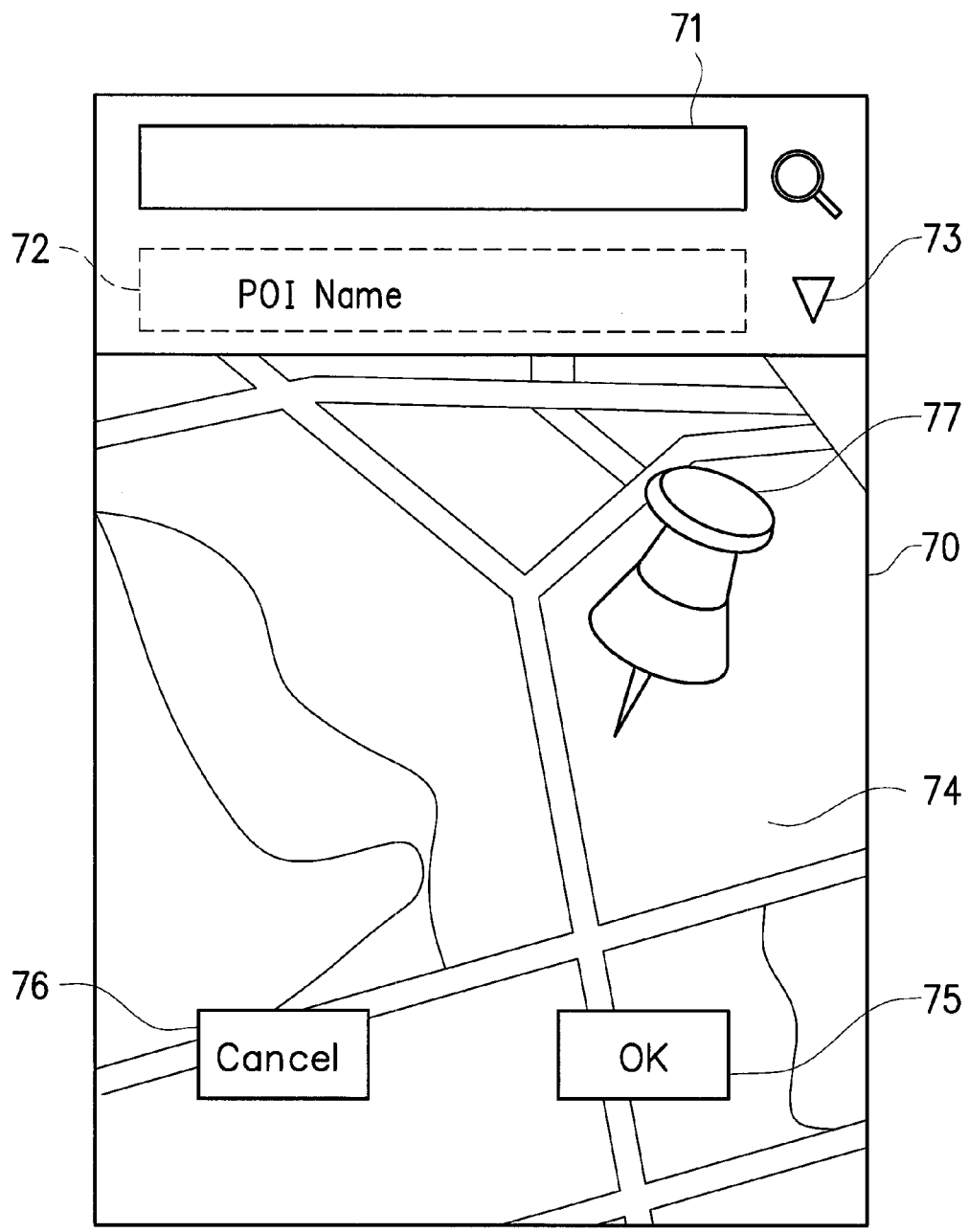
FIG. 7 is an example of a location picker according to an example of the present application.

For example, FIG. 7 is an example of a location picker according to an example of the present application. Referring to FIG. 7, the location picker 70 comprises an input field 71, a search result field 72, a mode switching button 73, an electronic map 74, a confirm button 75, and a cancel button 76. The location picker 70 may be called out when the user creates a new event in the calendar. The user may enter keywords related to the event location in the input field 71. Accordingly, the mobile apparatus searches for the POIs matching the keywords from the database thereof and shows the searched POIs in the search result field 72. The user may press the mode switching button 73 to enter a list mode so as to see all the search results. Besides, the mobile apparatus shows the electronic map 74 around the searched POI and marks the searched POI on the electronic map 74 with an indicator 77. The user may pan the electronic map 74 without moving the indicator 77, so as to adjust the location pointed by the indicator 77. Finally, the user may press the confirm button 75 to set the POI pointed by the indicator 77 as the event location, or press the cancel button 76 to cancel the setting of event location. It is noted that since the selections of the POI and the location thereof is determined by the user, the event location set in the calendar may be not accurate and is required to be further verified.

Accordingly, when the user attends the event, the positioning module 520 automatically obtains first positioning information of a current location of the mobile apparatus 500 during the time of the first event according to the first schedule, for example in the beginning or end of the time of the first event, after a period of time of the start of the first event, or before a period of time of the end of the first event, and the storage module 530 stores the first positioning information as event positioning information of the first location (step S620). To be specific, based on the first schedule of the first event, the positioning module 520 may know the time that the user (or the mobile apparatus itself) stays in the event location. Accordingly, the mobile apparatus 500 may activate the positioning module 520 in the beginning, middle, or end of the event, so as to obtain positioning information of the event location.

Further, since the signal strength detected by the mobile apparatus may vary under different circumstances, the positioning information obtained by the positioning module 520 may not be accurate. To increase the accuracy of the positioning information, the positioning module 520 may repeatedly obtain multiple first positioning information during the first event, compare the obtained multiple first positioning information with each others to conclude the most repeatedly first location information as the event positioning information, for example by obtaining a positioning information being matched or obtained most, and then store the concluded positioning information as the event positioning information of the first location.

In case that the positioning information of the first location has been stored before by using the method of the present application. Before storing the first positioning information, the storage module 530 may compare the first positioning information with a previously stored event positioning information of the first location. If the first positioning information matches the previously stored event positioning information, the storage module 530 may keep the previously stored event positioning information. If the first positioning information does not match the previously stored event positioning information, the storage module 530 replaces the previously stored event positioning information with the first positioning information. In another embodiment, if the positioning information of the first location has been stored before, the new positioning information will not be obtained again, unless the user wants to replace the previously stored event positioning information.

It is noted that after the first positioning information is obtained, the mobile apparatus 500 may transmit the first positioning information to a remote server (not shown) by using a data transmitting module, so as to store the first positioning information in the remote server as the event positioning information of the first location. In another embodiment, if the first location is new and not stored in the remote server previously, the mobile apparatus 500 may transmit the information of the new first location and the first positioning information as the event positioning information of the new first positioning information.

Finally, the reminding module 540 retrieves the event positioning information for reminding the calendar schedule when the first location is set in a next event (step S630). To be specific, the aforesaid first location and the corresponding event positioning information may be stored in the mobile apparatus 500 or in a remote server (not shown), such that when the first location is used as the location of another event, the mobile apparatus 500 may retrieve the event positioning information directly from itself or from the remote server, so as to precisely determine the reminding time of the event. Embodiments are given below for further illustration.

Figure 8:
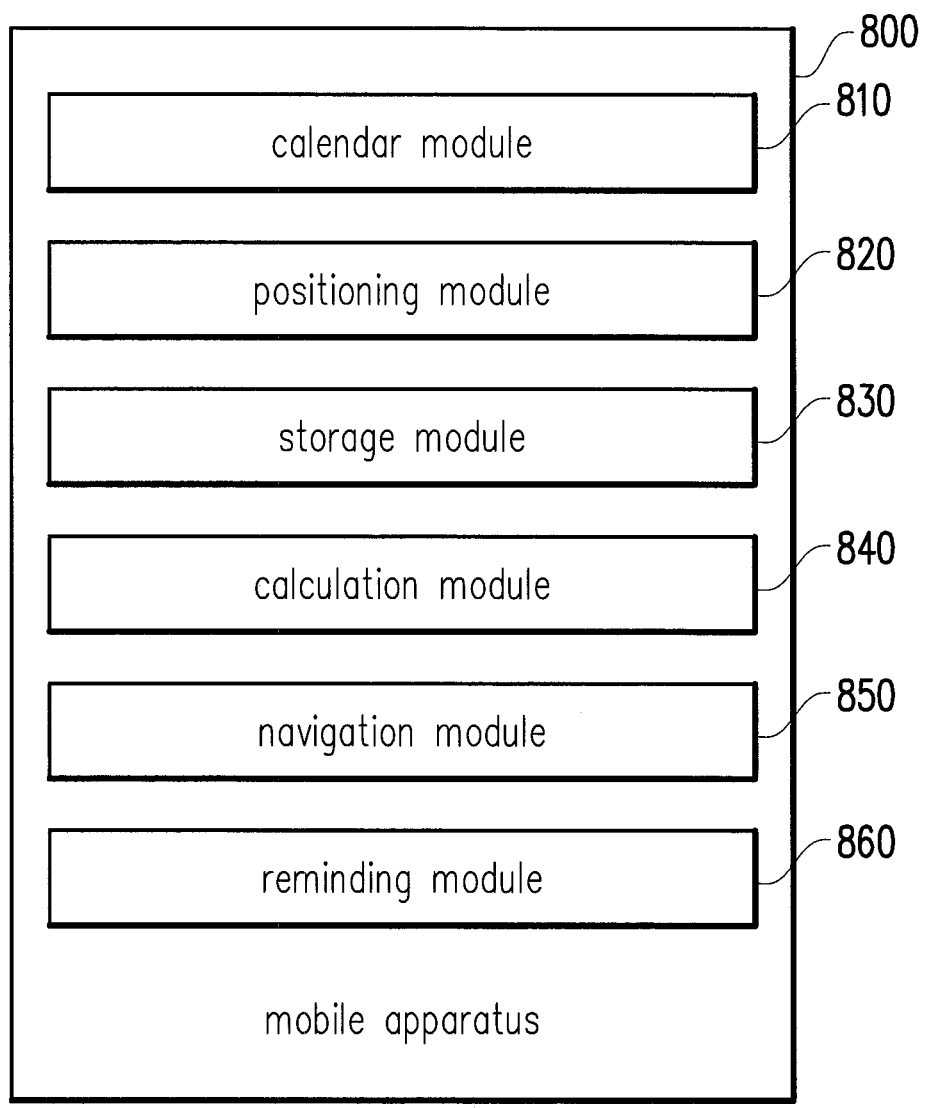
FIG. 8 is a block diagram of a mobile apparatus for reminding a calendar schedule according to an example of the present application.

FIG. 8 is a block diagram of a mobile apparatus for reminding a calendar schedule according to an example of the present application. Referring to FIG. 8, in the present example, the mobile apparatus 800 comprises a calendar module 810, a positioning module 820, a storage module 830, a calculation module 840, a navigation module 850, and a reminding module 860. The mobile apparatus 800 is, for example, a mobile phone, a smart phone, a PDA, a PDA phone, a navigation device, a notebook, a car PC, or a media player, carried by a user and capable of reminding the user to set off in advance for an event.

Figure 9:
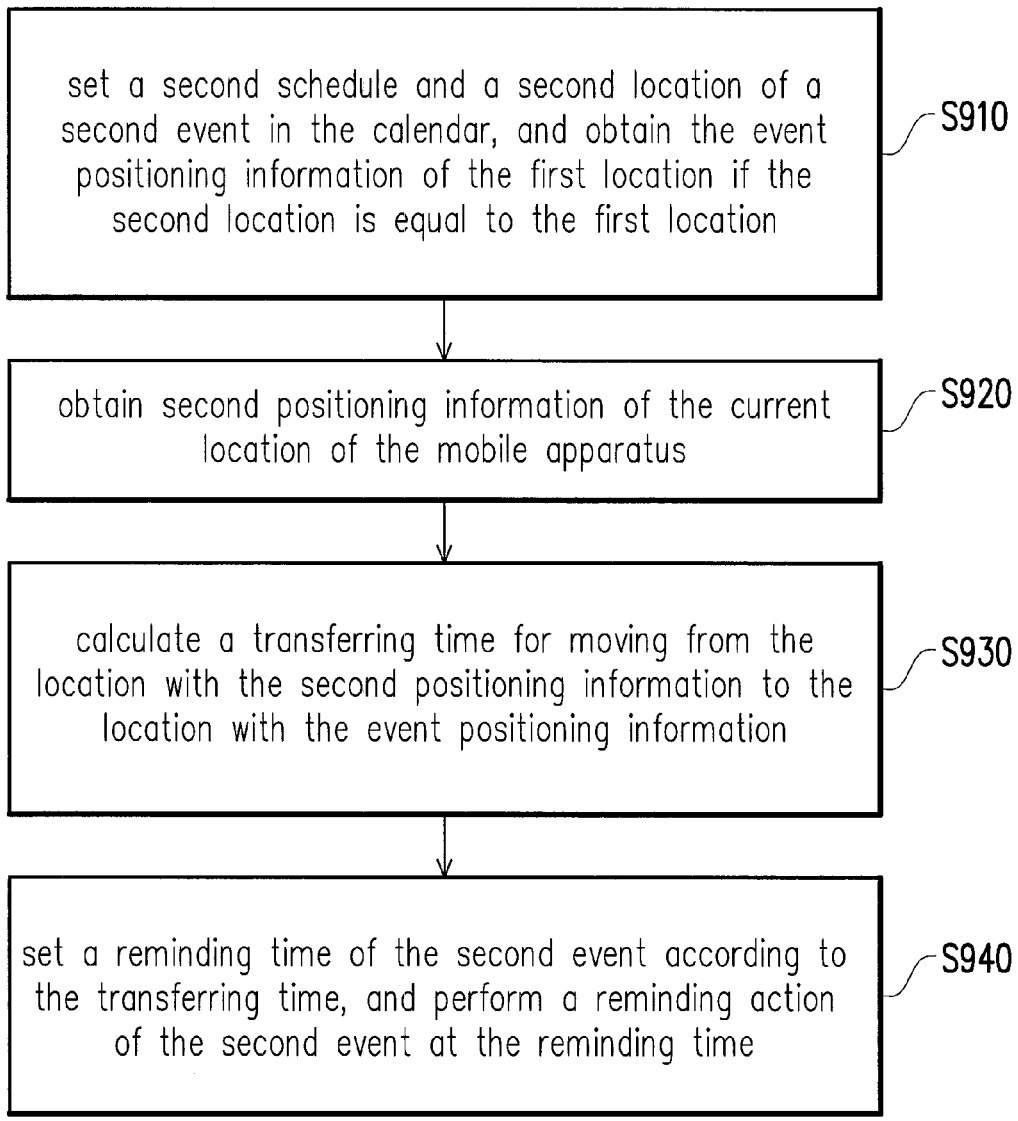
FIG. 9 is a flowchart of a method for reminding a calendar schedule according to an example of the present application.

FIG. 9 is a flowchart of a method for reminding a calendar schedule according to an example of the present application. Referring to FIGS. 8 and 9, the method of the present example is adapted to the mobile apparatus 800 of FIG. 8, and detailed steps of the method for reminding a calendar schedule of the present application are described below in collaboration with various components of the mobile apparatus 800.

First, the calendar module 810 sets a second schedule and a second location of a second event in the calendar of the mobile apparatus 800, and obtains the event positioning information of the first location if the second location is equal to the first location (step S910). For example, if the name of the first location and the name second location are the same or similar, then the first location and the second location are considered the same location. The event may be a conference, a class, a meeting, a date, or something the user needs to do. The mobile apparatus 800 may obtain positioning information of the location through the positioning module 820 or by inquiring a positioning information database having positioning information of a plurality of locations that is previously obtained and stored through aforesaid method.

To be specific, when the user set an event, if the user is at the same location of the event (for example, in the same building, office, meeting room, company, scenic spot, etc.), positioning information of the event location can be obtained instantly through the positioning module 820 and the current location of the mobile apparatus is used as the positioning information of the event location. On the other hand, if the user is at a location different from the event location when the user sets the event, the positioning information of the event location can be obtained by inquiring the positioning information database. These locations may be general points of interest (POI) in an electronic map or may also be locations stored in previous events, and the positioning information comprises (but is not limited to) addresses, roads, blocks, buildings, or site names, etc.

To obtain the positioning information of the event location by inquiring the positioning information database, the name of POI entered by the user when the user sets the event location is compared with the event locations stored in the positioning information database. The positioning information database may be stored in a storage of the mobile apparatus 800 or in an external server. The mobile apparatus 800 may obtain the desired positioning information by querying the server.

After the event is set in the calendar, the mobile apparatus 800 constantly detects the location of the user through the positioning module 820 to obtain second positioning information of the current location of the user (step S920). Besides positioning the user through a global positioning system (GPS), the mobile apparatus 800 may also position the user through a base station provided by a communication service provider or through a nearby wireless fidelity (Wi-Fi) hotspot (access point). The foregoing positioning methods require only very low power consumption therefore allow the mobile apparatus 800 to detect the location of the user for a long time.

In another example of the present application, after the event is set in the calendar, the user can set a time for the mobile apparatus 800 to start detecting the current location of the mobile apparatus 800 through the positioning module 820 according to the user's own situation, so as to obtain the second positioning information of the current location. For example, the user may set that the positioning module 820 is only turned on in a period of time (for example, 6 hours) before the event starts or at a specific time. The power consumed by the positioning module 820 can be reduced through the method described above.

After that, the calculation module 840 of the mobile apparatus 800 calculates a transferring time for moving from the location with the second positioning information to the location with the event positioning information (step S930). In other words, the calculation module 840 calculates the time required by the user to reach the event location from the user's current location, and the transferring time may be calculated by referring to road information and/or weather information.

To be specific, when the calculation module 840 calculates the transferring time, the mobile apparatus 800 first plans a path for moving from the location with the second positioning information to the location with the event positioning information through a navigation module 850 in the mobile apparatus 800 or in an external server and then calculates the transferring time for moving from the location with the second positioning information to the location with the event positioning information through the calculation module 840 by referring to the road speed limit information of one or multiple roads passed through by the path in the electronic map, or referring to an average speed under current traffic condition.

It is noted that after the transferring time is calculated, the reminding module 860 may compare the transferring time with a rest time from a current time to the second schedule of the second event, and determines whether the transferring time is longer than the rest time. If reminding module 860 determines that the transferring time is longer than the rest time, it means the user of the mobile apparatus 800 shall be late for the second event, and accordingly the reminding module 860 may automatically prompt a message indicating a late arrival for the second event, so as to remind the user. Further, in another example, the reminding module 860 may obtain a list of attendee of the second event and retrieve contact information of each of at least one attendee of the second event from the calendar, contact list, email address list and/or other resources in the mobile apparatus or from a server, a social network service, and/or instant message service, etc., and sends the message indicating the late arrival for the second event to the attendee according to the retrieved contact information, so as to remind the attendees that the user of the mobile apparatus may be late for the event.

Further, the calculation module 840 may obtain a weather condition along the path by inquiring a server of a weather center and calculate the transferring time by referring to the inquired weather condition. For example, if the weather condition is raining, the calculation module 840 determines it may take more time to attend the event and accordingly increases the transferring time. If the weather condition is snowing or icing, the calculation module 840 determines it must take more time to attend the event and increases the transferring time by a larger amount. If the weather condition shows there is a thunderstorm, the calculation module 840 determines it is not possible to attend the event and accordingly sets the transferring time as unlimited.

It should be mentioned that if there is no navigation software or the distance between the location with the first positioning information and the location with the second positioning information is short, the calculation module 840 can directly calculate the distance between the location with the first positioning information and the location with the second positioning information, and then divide the distance by the road speed limit information (for example, a road average speed limit information stored in the electronic map or position information database) or walking pace (for example, 5-7 km/hr) to obtain the transferring time; however, the present application is not limited to the calculation methods described above.

It should be mentioned that even though in the examples described above, the transferring time for moving from the location with the second positioning information to the location with the event positioning information is calculated by using the distance (for example, the road distance or straight distance) between the location with the event positioning information and the location with the second positioning information and a speed limit information (for example, road speed limit information or an average speed limit information) or walking pace, the present application is not limited thereto, and any method which can calculate the transferring time for moving from the location with the second positioning information to the location with the event positioning information may be applied to the present application.

Finally, the reminding module 860 sets a reminding time of the event according to the transferring time and performs a reminding action of the event at the reminding time (step S940). The reminding action may be giving out a reminding sound, playing an audio message, or displaying a reminding message in the mobile apparatus 800; however, the scope of the reminding action is not limited in the present application. It should be noted herein that the reminding time is a time earlier than the schedule of the event for the length of the transferring time or for the length of the transferring time plus a predetermined time, in which the predetermined time can be set by the mobile apparatus 800 or by the user when the user sets the event; however, the present application is not limited thereto.

Through the method described above for dynamically adjusting the reminding time, the user can receive the reminding message at the time that can make the user to arrive at the event in time regardless of the location thereof. It should be mentioned that in the present application, in order to reduce the power consumption of the positioning module, whether the user is around the event location is further determined to decide whether to advance the reminding time. This will be described below with reference to an example of the present application.

Figure 10:
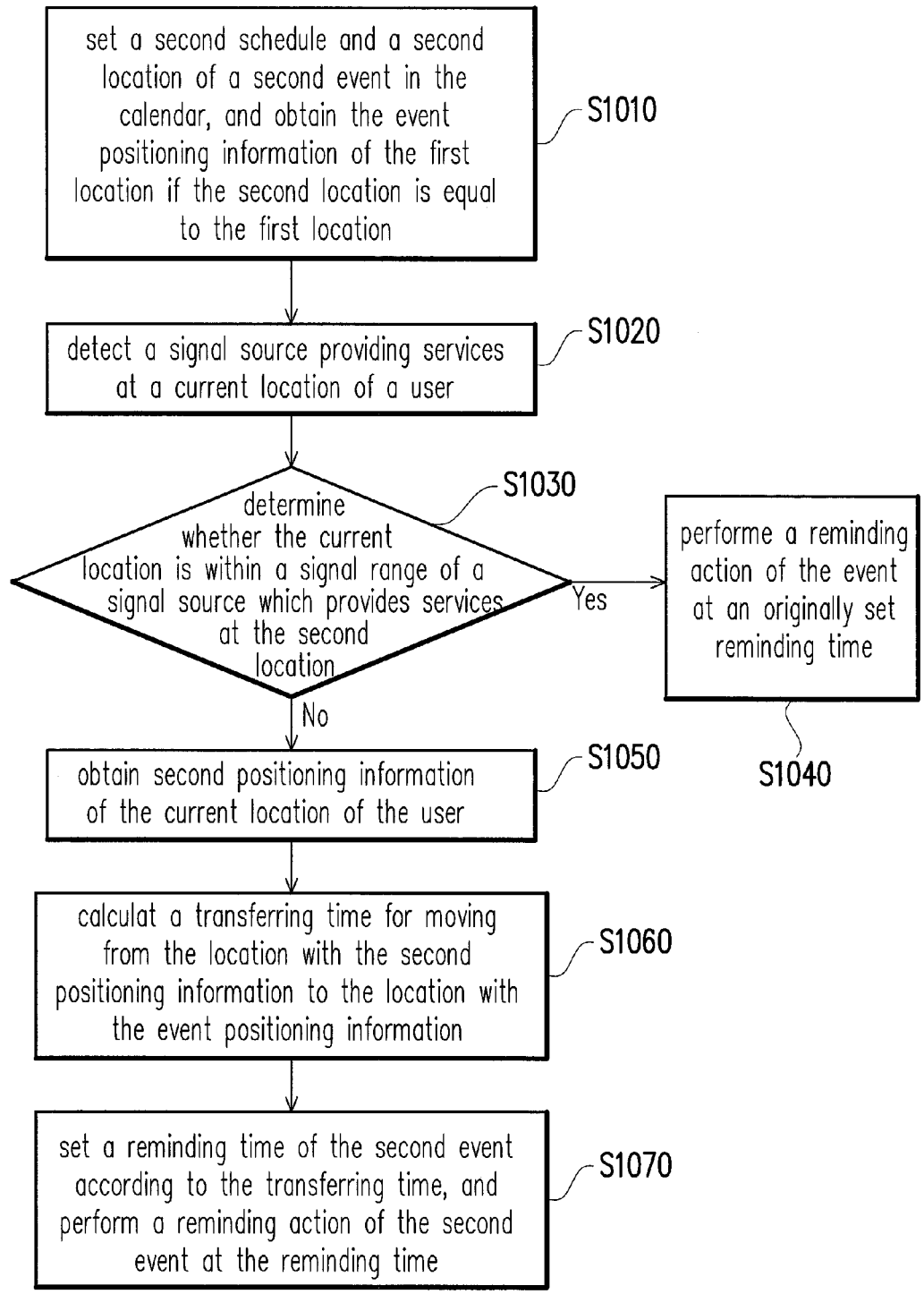
FIG. 10 is a flowchart of a method for reminding a calendar schedule according to an example of the present application.

FIG. 10 is a flowchart of a method for reminding a calendar schedule according to an example of the present application. Referring to FIG. 10, the method in the present example is adapted to the mobile apparatus 800 of FIG. 8, and detailed steps of the method for reminding a calendar schedule are described below in collaboration with various components of the mobile apparatus 800.

Similarly, in the present example, the calendar module 810 sets a second schedule and a second location of a second event in a calendar of the mobile apparatus 800, and obtains first positioning information of the location if the second location is equal to the first location (step S1010).

Then, the mobile apparatus 800 detects a signal source for providing service at a current location of the user by using the positioning module 820 (step S1020) and determines whether the current location is within a signal range of the signal source (step S1030). For example, the mobile apparatus 800 can identify whether a base station which provides services at the location of the user is the same base station for providing services at the event location by using an identification code received from the base station.

If it is determined in step S1030 that the current location is still within the signal range of the signal source which provides services at the event location, the reminding module 860 performs the reminding action of the event at the originally set reminding time (step S1040), and the calculation module 840 stops calculating the transferring time to advance the reminding time through the method provided by the present application. In short, the mobile apparatus 800 determines whether the user is close to the event location based on whether the user is within the signal range of the base station which provides services at the event location. If the user is around the base station for providing services at the event location, it can be determined that the user is not far from the event location (for example, in the same building) and can reach the event location within the predetermined time, so that it is not necessary to detect the positioning information or calculate the transferring time. Since detecting the signal of a base station is only a routine work carried out in the standby state by each mobile phone, the power consumption of the mobile phone won't be increased. Thereby, the flexibility in using the reminding method provided by the present application is increased by adopting the method described above.

Contrarily, if it is determined that the current location is out of the signal range of the signal source for providing services at the event location, the mobile apparatus 800 further detects the current location of the user through the positioning module 820 so as to obtain second positioning information of the current location (step S1050). After that, the calculation module 840 calculates a transferring time required for moving from the location with the second positioning information to the location with the event positioning information (step S1060). Next, the reminding module 860 sets the reminding time of the event according to the transferring time, and performs a reminding action of the event at the reminding time (step S1070). The contents of steps S1050~S1070 are the same as or similar to those of the steps S920~S940 described in foregoing example such that the detail will not be described herein.

Figure 11:
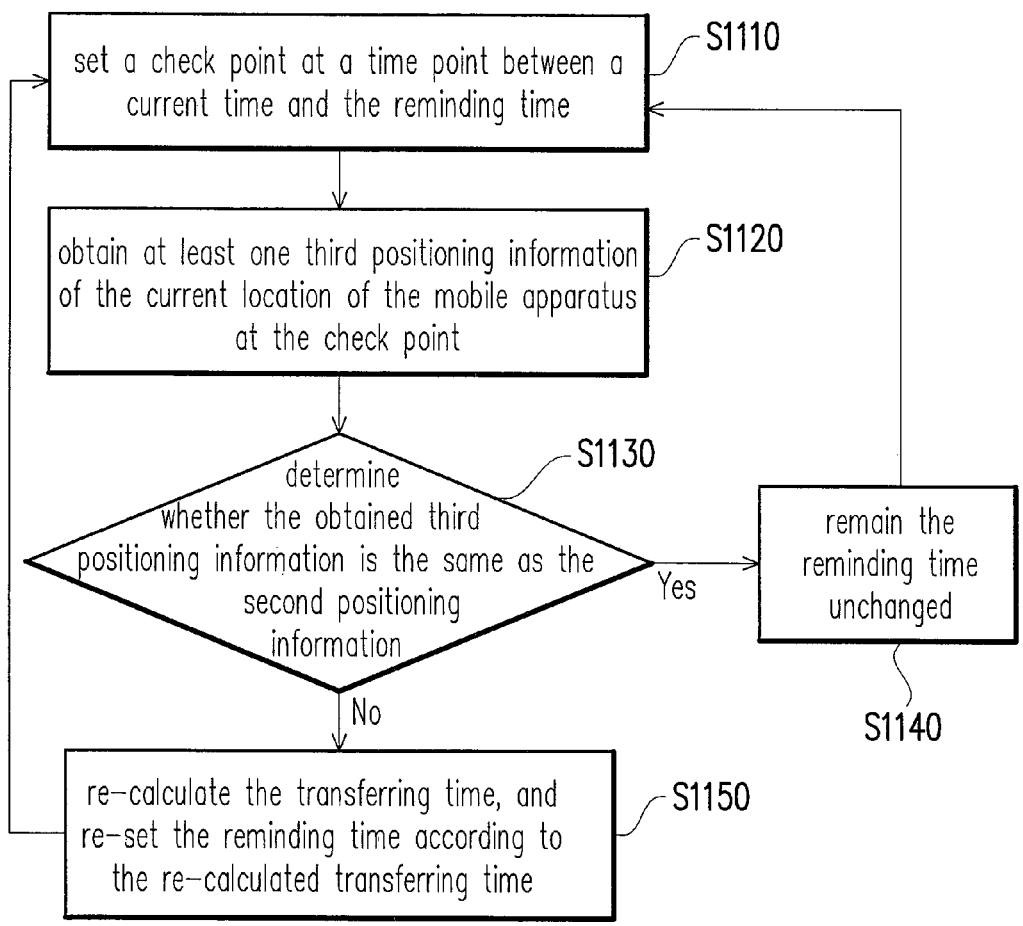
FIG. 11 is a flowchart illustrating a method for modifying the reminding time according to an example of the present application.

It is noted that, in the previous examples, the transferring time is calculated based on the current location of the mobile apparatus and the event location of the scheduled event. Since the user of the mobile apparatus may not stay at the same place all the time before the reminding time, the transferring time needs to be updated according to the movement of the mobile apparatus. In one example, the positioning module of the mobile apparatus may be turned on to monitor whether the location of the mobile apparatus is changed, so as to re-calculate the transferring time and re-set the reminding time in response to the location change. However, the positioning module may consume plenty of power of the mobile apparatus. To save the power, in another example, a plurality of check points are set to check the location change. In detail, FIG. 11 is a flowchart illustrating a method for modifying the reminding time according to an example of the application. Referring to FIG. 11, the method in the present example is adapted to the mobile apparatus 800 of FIG. 8, and discloses the steps for modifying the reminding time set in the step S1070 of FIG. 10.

First, the reminding module 860 obtains a current time and the reminding time of the second event, and then sets a check point at a time point between the current time and the reminding time (step S1110).

After the check points are set, the positioning module 820 obtains at least one third positioning information of the current location of the mobile apparatus at the check point (step S1120), and then the reminding module 860 may continue to determine whether the obtained third positioning information is the same as the previously obtained second positioning information of the current location of the mobile apparatus (step S1130).

If the third positioning information is the same as the second positioning information, it is determined that the mobile apparatus has not moved during the corresponding time interval and therefore the reminding time remains unchanged (step S1140) and the flow returns to step 1110 to re-set a next check point. However, if the third positioning information is not the same as the second positioning information, it is determined that the mobile apparatus has moved, and therefore the calculation module 840 may re-calculate the transferring time and re-set the reminding time according to the re-calculated transferring time. The method for calculating the transferring time and setting the reminding time is described in the above example, and therefore is not repeated herein. Finally, the flow returns to step S1110, so as to re-set the check points. It is noted that, the aforesaid steps may be repeated until the original reminding time is up, or until the length of the time period between the check point and the reminding time is less than a specific time length, such as an hour or 10 minutes.

In another example, after the positioning module 820 obtains the third positioning information of the current location of the mobile apparatus at each of the check points (step S1130), the reminding module 860 will not determine whether the obtained third positioning information is the same as the previously obtained second positioning information of the current location of the mobile apparatus and the calculation module 840 will directly re-calculate the transferring time and re-set the reminding time.

Figure 12:
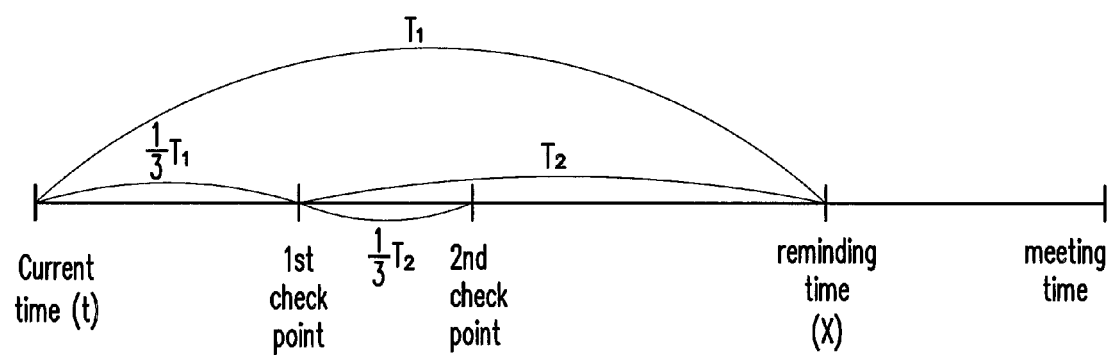
FIG. 12 is an example of setting check points according to an example of the present application.

For example, FIG. 12 is an example of setting check points according to an example of the application. Referring to FIG. 12, a period of time $T_1$ from a current time t to the reminding time X is calculated and a first check point is set at a time point having a length of one third $T_1$ from the current time. When the first check point is reached, it is determined whether the mobile apparatus has moved, and if the mobile apparatus has not moved, a second check point is further set at the time point having a length of one third $T_2$ from the first check point, in which the period of time $T_2$ is from the first check point to the reminding time X. The aforesaid steps may be repeated until the period of time between the check point and the reminding time X is less than a predetermined time period, for example 10 minutes. In another embodiment, when the first check point is reached, even if the mobile apparatus has moved, the second check point will be set to trace the location of the mobile apparatus and determine whether the mobile apparatus is moved after the first check point.

The present application further provides a recording medium which records a computer program to be loaded into a mobile apparatus to execute the calendar schedule reminding method described above. The computer program is composed of a plurality of program segments (for example, an organization chart establishing program segment, an approval form program segment, a setting program segment, and a deployment program segment). The program segments are loaded into the mobile apparatus and executed by the same to accomplish the calendar schedule reminding method and the functions of the calendar schedule reminding apparatus described above.

As described above, the present application provides a method and an apparatus for reminding a calendar schedule and a recording medium, in which a positioning function is integrated with a calendar such that when a user is far from the location of an event, the positioning module is automatically turned on to detect the positioning information of the user when the current location of the user exceeds a signal range of a signal source, and the distance between the user and the event location is taken into consideration for calculating a reminding time. Thereby, the power for detecting the positioning information of the user can be saved and the user can be reminded in advance and set off for the event on time. Accordingly, the reminding time of an event can be dynamically adjusted so that the user will not be late for the event due to the long distance between the user and the event location.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method for reminding a calendar schedule, suitable for a mobile apparatus, the method comprising:
    setting a first schedule and a first location of a first event in a calendar;
    obtaining first positioning information of a current location of the mobile apparatus during the first event according to the first schedule, and storing the first positioning information as event positioning information of the first location;
    setting a second schedule and a second location of a next event in the calendar, and obtaining the event positioning information of the first location if the second location is equal to the first location;
    obtaining second positioning information of the current location of the mobile apparatus;
    calculating a transferring time for moving from the location with the second positioning information to the location with the event positioning information; and
    setting a reminding time of the next event according to the transferring time, and performing a reminding action of the next event at the reminding time, wherein the reminding time is earlier than the schedule for a length of the transferring time and a predetermined time.

2. The method according to claim 1, wherein the step of setting the first schedule and the first location of the first event in the calendar comprises:
    retrieving a notification of the first event; and
    recognizing a location name in the notification and setting the location name as the first location of the first event.

3. The method according to claim 1, wherein the step of storing the first positioning information as event positioning information of the first location comprises:
    comparing the first positioning information with a previously stored event positioning information of the first location;
    if the first positioning information matches the previously stored event positioning information, keeping the previously stored event positioning information; and
    if the first positioning information does not match the previously stored event positioning information, replacing the previously stored event positioning information with the first positioning information.

4. The method according to claim 1, wherein the step of obtaining the first positioning information of the current location of the mobile apparatus during the first event according to the first schedule, and storing the first positioning information as the event positioning information of the first location further comprises:
    repeatedly obtaining multiple first positioning information during the first event;
    comparing the obtained multiple first positioning information with each others;
    concluding the first location information as the event positioning information; and
    storing the concluded first positioning information as the event positioning information of the first location.

5. The method according to claim 1, wherein the step of storing the first positioning information as the event positioning information of the first location comprises:
    transmitting the first positioning information to a remote server and storing to store the first positioning information in the remote server as the event positioning information of the first location.

6. A non-transitory recording medium, recording program instructions for executing a method for reminding a calendar schedule, suitable for a mobile apparatus, the method comprising:
    setting a first schedule and a first location of a first event in a calendar;
    obtaining first positioning information of a current location of the mobile apparatus during the first event according to the first schedule, and storing the first positioning information as event positioning information of the first location;
    setting a second schedule and a second location of a next event in the calendar, and obtaining the event positioning information of the first location if the second location is equal to the first location;
    obtaining second positioning information of the current location of the mobile apparatus;
    calculating a transferring time for moving from the location with the second positioning information to the location with the event positioning information; and
    setting a reminding time of the next event according to the transferring time, and performing a reminding action of the next event at the reminding time, wherein the reminding time is earlier than the schedule for a length of the transferring time and a predetermined time.

7. An apparatus for reminding a calendar schedule, comprising:
    a calendar module, configured to set a first schedule and a first location of a first event in a calendar;
    a positioning module, configured to obtain first positioning information of a current location during the first event according to the first schedule;
    a storage module, configured to store the first positioning information as event positioning information of the first location; wherein
    the calendar module is further configured to set a second schedule and a second location of a next event and obtain the event positioning information of the first location if the second location is equal to the first location; and
    the positioning module is further configured to obtain second positioning information of the current location;

a calculation module, configured to calculate a transferring time for moving from the location with the second positioning information to the location with the event positioning information; and a reminding module, configured to set a reminding time of the next event according to the transferring time and perform a reminding action of the next event at the reminding time, wherein the reminding time is earlier than the schedule for a length of the transferring time and a predetermined time.

8. The apparatus according to claim 7, wherein the calendar module is further configured to retrieve a notification of the first event, recognize a location name in the notification, and set the location name as the first location of the first event.

9. The apparatus according to claim 7, wherein the storage module is further configured to compare the first positioning information with a previously stored event positioning information of the first location, keep the previously stored event positioning information if the first positioning information matches the previously stored event positioning information, and replace the previously stored event positioning information with the first positioning information if the first positioning information does not match the previously stored event positioning information.

10. The apparatus according to claim 7, wherein the positioning module is further configured to repeatedly obtain multiple first positioning information during the first event, and the storage module is further configured to compare the obtained multiple first positioning information with each other, concluding the first location information as the event positioning information, and store the concluded first positioning information as the event positioning information of the first location.

11. The apparatus according to claim 7, further comprising:

a data transmitting module, configured to transmit the first positioning information to a remote server to store the first positioning information in the remote server as the event positioning information of the first location.

12. The method according to claim 1, wherein the first location comprises meeting room number, office name, company name, building name, or scenic spot name.

13. The method according to claim 1, wherein the first positioning information of the current location of the mobile apparatus is obtained through a base station provided by a communication service provider or through a nearby wireless fidelity (Wi-Fi) access point.

14. The non-transitory recording medium according to claim 6, wherein the step of storing the first positioning information as event positioning information of the first location comprises:

comparing the first positioning information with a previously stored event positioning information of the first location;

if the first positioning information matches the previously stored event positioning information, keeping the previously stored event positioning information; and if the first positioning information does not match the previously stored event positioning information, replacing the previously stored event positioning information with the first positioning information.

15. The non-transitory recording medium according to claim 6, wherein the step of obtaining the first positioning information of the current location of the mobile apparatus during the first event according to the first schedule, and storing the first positioning information as the event positioning information of the first location further comprises:

repeatedly obtaining multiple first positioning information during the first event;

comparing the obtained multiple first positioning information with each others;

concluding the first location information as the event positioning information; and storing the concluded first positioning information as the event positioning information of the first location.

16. The non-transitory recording medium according to claim 6, wherein the step of storing the first positioning information as the event positioning information of the first location comprises:

transmitting the first positioning information to a remote server to store the first positioning information in the remote server as the event positioning information of the first location.

17. The non-transitory recording medium according to claim 6, wherein the first location comprises meeting room number, office name, company name, building name, or scenic spot name.

18. The non-transitory recording medium according to claim 6, wherein the first positioning information of the current location of the mobile apparatus is obtained through a base station provided by a communication service provider or through a nearby wireless fidelity (Wi-Fi) access point.

19. The apparatus according to claim 7, wherein the first location comprises meeting room number, office name, company name, building name, or scenic spot name.

20. The apparatus according to claim 7, wherein the positioning module obtains the first positioning information of the current location during the first event through a base station provided by a communication service provider or through a nearby wireless fidelity (Wi-Fi) access point.

* * * * *